8964X
O. C. Burr.
Loom.
Patented Jul. 17, 1835.
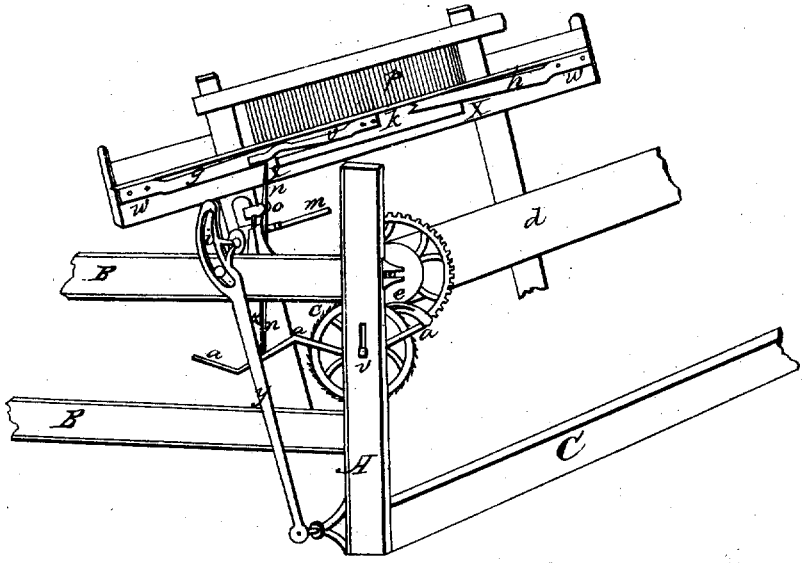
N. PETERS, PHOTO-LITHOGRAPHER, WASHINGTON, D. C.

8964X July 17, 1835 5.

Oliver C. Burr. July 17, 1835

The Schedule referred to in these Letters Patent and making part of the same, containing a description in the words of the said Oliver C. Burr himself of his improvement in the construction of Looms.

To all people to whom these Presents shall come. Be it known that I Oliver C. Burr of Milbury in the County of Worcester and Commonwealth of Massachusetts machinist have invented constructed and applied to use a new and valuable improvement in the construction of Looms, and that the following is a full and exact description of the construction and operation of the same, as invented or improved by me. Manufacturers have experienced great inconvenience in regulating the motion of the beam in the loom upon which the cloth as it is wove is wound. Many attempts have been made to remedy this evil & while for the most part they have totally failed of accomplishing the desired object. The few that have succeeded have been attended with so much expense, as to prevent their coming into general use. The improvement I have made is such that it can be added to the common loom and at a very trifling cost, and completely accomplishes the object (which has so long been desired); for by my plan the cloth beam which heretofore wound up the cloth only at intervals after several threads of filling had been added, moves at each flight of the shuttle, and thus winds up the cloth as fast as it is wove. The beam winds as each single thread of filling is added. This gives the cloth a uniform thickness and effectually prevents all unevenness in the texture of it. In addition to this advantage there is another effected by my improvement, which is equally important, which is that when the thread of the bobbin or spool either breaks or is out although the loom may continue in motion

X 1605 X the cloth beam is stationary, because the motion of this depends upon the filling — Explanation of the drawing, A. B. B. C. part of the frame of a loom w. w. Lathe of the loom p. Reed g. spring one end confined to the Lathe at w. r. another spring, h. another spring also confined to the Lathe at one end at w. — k. a piece of wood extending from y. to y. and let into the Lathe beam and confined to its place by means of the springs g. and h. and in the operation of the loom is pressed outwards by the reed at each vibration of the Lathe, a distance equal to the diameter of the thread of the filling. n. n. arm of lever turning upon a pin or fulcrum at O. the upper end of which is between the unconfined ends of the springs g. and h. is moved by the piece of wood k. z. at the lower end of the arm or lever is a shank or pin z. which touches the crooked arm a, a, a, — a. a. a. arm turning on the abor or shaft of the wheel c. at v. c. ratch wheel having a pinion upon its axle which moves the cog wheel b. b. cog wheel attached to the cloth beam, e. dogs or hands attach to the crooked arm a. a. a. for moving the ratch wheel c. — y. arm or sweep which vibrates the Lathe, i. the slot in the sweep to receive the end of the crank on the shaft m. m. shaft. operation the machine. — When the loom is put in motion. the lathe w. w. by mean of the crank upon the arbor m. moving in the irregular slot i is carried back, the thread of filling by means of the reed p. was carried back at the same time, the lower side of the reed p. being confined only by the piece of wood k. which is moveable, was pressed outward when the lathe fell back in consequence of the addition of a thread of the filling, the pressure of the piece of wood k. outward was very small equalling only the diameter of thread of filling. But this communicates a corresponding motion to the arm n. n. and the shank or pin z.

resting upon the crooked arm a.a.e, gave motion to that also, and by means of the dogs or hands and ratch wheel e. & pinion upon its axis, the cloth beam d. was moved, thus winding upon the cloth beam the very small piece of cloth made by the addition of the thread of filling. The springs g. and h. press the reed by means of k. back to its place. By changing the position of the pin or fulcrum of the arm n.n. which is at o. the texture of the cloth may be altered & may be made thick or thin at pleasure and the warp slacked or strained according to the strength of the yarn. The motion of the arm or lever n.n. by which the cloth beam is turned, may be communicated as well from the lathe beam or sweep q, as from the reed p. All I claim as my invention is the motion communicated to the cloth beam by means of the arm or lever n.n. In witness that the above is a true specification of my said improvement I have hereunto set my hand this twenty third day of May in the year of our Lord one thousand eight hundred and thirty five Recd
Recd
Appd
4 8. 1835
C.M.
Examined
A/[illegible]
R.R.

Witnesses
T. T. Farnsworth
John Wilson
Christopher Columbus Baldwin

Oliver C. Burr 924 wd (Drawing)